US009225010B2

(12) United States Patent
Nakanishi et al.

(10) Patent No.: US 9,225,010 B2
(45) Date of Patent: Dec. 29, 2015

(54) SILICON-CONTAINING PARTICLES, NEGATIVE ELECTRODE MATERIAL FOR NONAQUEOUS ELECTROLYTE SECONDARY BATTERY USING THE SAME, NONAQUEOUS ELECTROLYTE SECONDARY BATTERY, AND METHOD OF MANUFACTURING SILICON-CONTAINING PARTICLES (71) Applicant: SHIN-ETSU CHEMICAL CO., LTD., Tokyo (JP)

(72) Inventors: Tetsuo Nakanishi, Annaka (JP); Yoshiyasu Yamada, Tomioka (JP); Kazuyuki Taniguchi, Annaka (JP); Motoyuki Yamada, Saitama (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 74 days.

(21) Appl. No.: 13/925,332

(22) Filed: Jun. 24, 2013

(65) Prior Publication Data
US 2014/0038050 A1 Feb. 6, 2014

(30) Foreign Application Priority Data

Aug. 3, 2012 (JP) ................................. 2012-173324

(51) Int. Cl.
| H01M 2/16 | (2006.01) |
| H01M 4/134 | (2010.01) |
| B23K 15/02 | (2006.01) |
| H01M 4/1395 | (2010.01) |
| H01M 4/04 | (2006.01) |
| H01M 4/38 | (2006.01) |
| B23K 15/00 | (2006.01) |
| H01M 4/86 | (2006.01) |
| H01M 4/62 | (2006.01) |

(52) U.S. Cl.
CPC .......... *H01M 4/134* (2013.01); *B23K 15/0006* (2013.01); *B23K 15/0086* (2013.01); *B23K 15/02* (2013.01); *H01M 4/0469* (2013.01); *H01M 4/1395* (2013.01); *H01M 4/386* (2013.01); *B23K 2201/38* (2013.01); *B23K 2203/00* (2013.01); *H01M 4/622* (2013.01); *H01M 4/8621* (2013.01); *Y02E 60/122* (2013.01)

(58) Field of Classification Search
CPC .. B23K 2203/00; H01M 4/134; H01M 4/386; H01M 4/622; H01M 4/0469; H01M 4/8621; H01M 4/1395; Y02E 60/122

USPC ............................. 429/302, 209, 231.95, 252
See application file for complete search history.

(56) References Cited

U.S. PATENT DOCUMENTS

| 5,556,721 | A | 9/1996 | Sasaki et al. | |
| 6,413,672 | B1 | 7/2002 | Suzuki et al. | |
| 6,685,804 | B1 | 2/2004 | Ikeda et al. | |
| 6,887,511 | B1 | 5/2005 | Shima et al. | |
| 2006/0275662 | A1 | 12/2006 | Hirose et al. | |
| 2009/0111031 | A1* | 4/2009 | Hirose et al. | ................... 429/332 |
| 2010/0266902 | A1* | 10/2010 | Takano et al. | ............. 429/231.95 |
| 2011/0287317 | A1 | 11/2011 | Nakanishi | |

FOREIGN PATENT DOCUMENTS

| JP | B2-2964732 | 10/1999 |
| JP | A-2000-173596 | 6/2000 |
| JP | B2-3079343 | 8/2000 |
| JP | B2-3291260 | 6/2002 |
| JP | A-2003-109590 | 4/2003 |
| JP | A-2004-185991 | 7/2004 |
| JP | A-2004-303593 | 10/2004 |
| JP | 2005-011650 A | 1/2005 |
| JP | B2-3702223 | 10/2005 |
| JP | B2-3702224 | 10/2005 |
| JP | A-2005-317309 | 11/2005 |
| JP | A-2006-338996 | 12/2006 |
| JP | B2-4183488 | 11/2008 |
| JP | 2009-110846 A | 5/2009 |
| JP | 2011-049096 A | 3/2011 |
| JP | 2012-009421 A | 1/2012 |

OTHER PUBLICATIONS

Jan. 13, 2015 Japanese Office Action issued in Japanese Patent Application No. 2012-173324.

* cited by examiner

*Primary Examiner* — Patrick Ryan
*Assistant Examiner* — Ben Lewis
(74) *Attorney, Agent, or Firm* — Oliff PLC (57) ABSTRACT The present invention intends to provide silicon-containing particles that, when used as a negative electrode active material for a nonaqueous electrolyte secondary battery, can form a nonaqueous electrolyte secondary battery that is less in volume change during charge/discharge and has high initial efficiency and excellent cycle characteristics. The present invention provides silicon-containing particles that are used as a negative electrode active material for a nonaqueous electrolyte secondary battery and have a diffraction line with a peak at $2\theta=28.6°$ in X-ray diffractometry, a negative electrode material for a nonaqueous electrolyte secondary battery therewith, a nonaqueous electrolyte secondary battery, and a method of manufacturing the silicon-containing particles.

19 Claims, 9 Drawing Sheets

SILICON-CONTAINING PARTICLES, NEGATIVE ELECTRODE MATERIAL FOR NONAQUEOUS ELECTROLYTE SECONDARY BATTERY USING THE SAME, NONAQUEOUS ELECTROLYTE SECONDARY BATTERY, AND METHOD OF MANUFACTURING SILICON-CONTAINING PARTICLES

BACKGROUND OF THE INVENTION

1. Field of the Invention

The present invention relates to silicon-containing particles suitable for a negative electrode active material for a nonaqueous electrolyte secondary battery.

2. Description of the Related Art

In recent years, as portable electronic devices and communication devices develop remarkably, from the viewpoint of economic efficiency and miniaturization and light weight of devices, a nonaqueous electrolyte secondary battery having a high energy density is in strong demand.

Since silicon has a theoretical capacity of 4200 mAh/g far higher than 372 mAh/g of a theoretical capacity of a carbon material that is being put into practical use at the present time, silicon is a material that is most highly expected in attaining miniaturization and higher capacity of a battery.

For example, in Patent Document 1, a lithium ion secondary battery where single crystal silicon is used as a base material of a negative electrode active material is disclosed.

Further, in Patent Document 2, lithium ion secondary batteries each of which uses a lithium alloy of $Li_xSi$ (x is 0 to 5) of single crystal silicon, polycrystalline silicon or amorphous silicon are disclosed. In particular, $Li_xSi$ that uses amorphous silicon is preferred, and a crushed material of crystalline silicon covered with amorphous silicon obtained by plasma decomposition of monosilane is exemplified.

However, in this case, as shown in example, since 30 parts by mass of silicon and 55 parts by mass of graphite as a conductive agent are used, a battery capacity of silicon could not be fully exerted.

Further, in Patent Documents 3 to 5, a method of utilizing a negative electrode that was obtained by vapor depositing an amorphous silicon thin film on an electrode current collector is disclosed.

In the method of vapor depositing silicon directly on a current collector, also a method where, by controlling a growth direction, the cycle characteristics is prevented from deteriorating due to volume expansion is disclosed (see Patent Document 6). According to the method, it is said that a negative electrode having a high capacity and excellent cycle characteristics can be obtained. However, there were problems that since the production speed is limited, coat is high for the reason why the production speed is limited, a silicon thin film is difficult to make thicker, and copper that is a negative electrode current collector diffuses in silicon.

Therefore, in recent years, a method where while using silicon-containing particles, by limiting a utilization rate of battery capacity of silicon, a volume expansion is suppressed (see Patent Documents 7 to 9), a method where as a method of using a grain boundary of polycrystalline particles as a buffer zone of volume change, a silicon melt to which alumina is added is quenched (see Patent Document 10), a method where polycrystalline particles of mixed polycrystals of α, β-$FeSi_2$ are used (see Patent Document 11), and a method where a single crystal silicon ingot is processed by high temperature plastic working (see Patent Document 12) are disclosed.

As was described above, in order to utilize silicon as an active material, metallic silicon and silicon alloys, which have various crystal structures have been proposed. However, all of these are disadvantageous from the viewpoint of cost, that is, a method that allows to cheaply mass-produce has not been proposed.

Patent Document 1: Japanese Patent No. 2964732
Patent Document 2: Japanese Patent No. 3079343
Patent Document 3: Japanese Patent No. 3702223
Patent Document 4: Japanese Patent No. 3702224
Patent Document 5: Japanese Patent No. 4183488
Patent Document 6: Japanese Unexamined Patent Application Publication No. 2006-338996
Patent Document 7: Japanese Unexamined Patent Application Publication No. 2000-173596
Patent Document 8: Japanese Patent No. 3291260
Patent Document 9: Japanese Unexamined Patent Application Publication No. 2005-317309
Patent Document 10: Japanese Unexamined Patent Application Publication No. 2003-109590
Patent Document 11: Japanese Unexamined Patent Application Publication No. 2004-185991
Patent Document 12: Japanese Unexamined Patent Application Publication No. 2004-303593

SUMMARY OF THE INVENTION

The present invention has been achieved in view of the above problems and intends to cheaply provide silicon-containing particles that, when used as a negative electrode active material, can form a nonaqueous electrolyte secondary battery that is less in volume change during charge/discharge and has high initial efficiency and excellent cycle characteristics.

In order to achieve the object, the present invention provides silicon-containing particles that are used as a negative electrode active material for a nonaqueous electrolyte secondary battery and have a diffraction line with a peak at $2\theta=28.6°$ in X-ray diffractometry.

When such the silicon-containing particles are used, since a volume change is suppressed and a stress at a grain boundary can be relaxed, by using the silicon-containing particles as a negative electrode active material for a nonaqueous electrolyte secondary battery, cheap silicon-containing particles that can provide a nonaqueous electrolyte secondary battery having a high capacity and a long life can be obtained.

At this time, the silicon-containing particles preferably contain one kind or two or more kinds selected from boron, aluminum, phosphorus, titanium, vanadium, chromium, manganese, iron, cobalt, nickel, copper, zinc, arsenic, germanium, tin, antimony, indium, tantalum, tungsten, and gallium.

When such the elements are contained, the volume resistivity can be reduced and silicon-containing particles having excellent conductivity can be obtained.

Further, the present invention provides a negative electrode material for a nonaqueous electrolyte secondary battery that is characterized by using silicon-containing particles of the present invention as a negative electrode active material for a nonaqueous electrolyte secondary battery.

When such the silicon-containing particles of the present invention are used as a negative electrode active material for a nonaqueous electrolyte secondary battery, a negative electrode material for a nonaqueous electrolyte secondary battery that can cheaply provide a nonaqueous electrolyte secondary battery having a high capacity and a long life is obtained.

At this time, the negative electrode material for a nonaqueous electrolyte secondary battery preferably contains a binder.

When such the binder is contained, a negative electrode material for a nonaqueous electrolyte secondary battery that can suppress peeling off a current collector that follows a volume expansion due to charge/discharge and separation of the active material can be obtained.

At this time, the binder is preferably a polyimide resin.

When the binder is such the polyimide resin, a negative electrode material for a nonaqueous electrolyte secondary battery that has excellent solvent resistance and can effectively suppress a negative electrode active material from separating can be obtained.

At this time, it is preferable that the negative electrode material for a nonaqueous electrolyte secondary battery includes a conductive agent, and it is preferable that a ratio of the negative electrode active material for a nonaqueous electrolyte secondary battery with respect to the negative electrode material is 60 to 97% by mass, a ratio of the binder with respect to the negative electrode material is 3 to 20% by mass, and a ratio of the conductive agent with respect to the negative electrode material is 0 to 37% by mass.

When contained at such the ratios, a negative electrode material for a nonaqueous electrolyte secondary battery in which the conductivity of a negative electrode material is effectively improved, and a negative electrode active material is prevented from separating can be obtained.

Further, a nonaqueous electrolyte secondary battery that includes at least a negative electrode compact that is manufactured by molding a negative electrode material for a nonaqueous electrolyte secondary battery of the present invention, a positive electrode compact, a separator, and a nonaqueous electrolyte is provided.

When such the negative electrode material for a nonaqueous electrolyte secondary battery of the present invention is used, a nonaqueous electrolyte secondary battery that has a high capacity and a long life can be obtained.

At this time, the nonaqueous electrolyte secondary battery is preferably a lithium ion secondary battery.

A nonaqueous electrolyte secondary battery of the present invention can be a lithium ion secondary battery.

Further, the present invention relates to a method of manufacturing silicon-containing particles that are used as a negative electrode active material for a nonaqueous electrolyte secondary battery, wherein, when silicon is vapor deposited by electron beam heating, by controlling an output of an electron beam, silicon-containing particles having a diffraction line with a peak at $2\theta=28.6°$ in X-ray diffractometry are manufactured.

By manufacturing the silicon-containing particles by controlling an output of an electron beam in an electron beam heating method like this, when the particles are used as a negative electrode active material for a nonaqueous electrolyte secondary battery, a volume change can be suppressed and stress in a grain boundary can be relaxed, therefore, silicon-containing particles that can provide a nonaqueous electrolyte secondary battery having a high capacity and a long life can be cheaply manufactured.

At this time, an output of the electron beam is preferably controlled in the range of 0.5 to 3.5 kW/cm$^2$.

By controlling an output of an electron beam in such the range, silicon-containing particles of the present invention can be more easily manufactured.

As was described above, according to the present invention, cheap silicon-containing particles that, when used as a negative electrode active material for a nonaqueous electrolyte secondary battery, can provide a nonaqueous electrolyte secondary battery having a high capacity and a long life can be obtained.

DETAILED DESCRIPTION OF THE PREFERRED EMBODIMENTS

The present inventors studied hard about a silicon-based active material of which a battery capacity per volume exceeds 844 mAh/cm$^3$ of a carbon material, and a cheap manufacturing method thereof.

As a result thereof, it was found that silicon-containing particles that have, when analyzed in the range of $2\theta=22°$ to $35°$ by X-ray diffractometry, a diffraction line of 28.4° attributed to Si(111) of a diamond structure and a peak at 28.6°, or only a diffraction line having a peak at 28.6° are an active material that has an initial efficiency and a battery capacity such high as exceeding 1500 mAh/cm$^3$, and is excellent in the cycle characteristics and is effective as a negative electrode for a nonaqueous electrolyte secondary battery in which a volume change is suppressed during charge/discharge, and since cheap metallic silicon can be used as a raw material, production cost can be largely reduced compared with that of a conventional method, thus the present invention was completed.

Hereinafter, the present invention will be detailed with reference to drawings. However, the present invention is not limited thereto.

Silicon-containing particles of the present invention are used as a negative electrode active material for a nonaqueous electrolyte secondary battery and have, in X-ray diffractometry analyzed in the range of $2\theta=22°$ to $35°$, a diffraction line with a peak at 28.6°.

When such silicon-containing particles are used as a negative electrode active material for a secondary battery that uses a non-aqueous electrolyte, a volume change during charge/discharge is suppressed and a stress at a grain boundary is relaxed. Therefore, wile maintaining a high initial efficiency and a high capacity of silicon, a nonaqueous electrolyte secondary battery having excellent cycle characteristics can be obtained.

Further, since cheap metallic silicon can be used as a raw material, polycrystalline silicon-containing particles suitable for a negative electrode active material having the excellent battery characteristics as was described above can be abundantly manufactured, and manufacture cost can be largely reduced more than a conventional method.

Hereinafter, measurement conditions of X-ray diffractometry will be exemplified.

As an X-ray diffractometer, D8 ADVANCE (type name, manufactured by BRUKER AXS, Inc.) can be used. Measurement conditions are as shown below. That is, X-ray source: Cu K$_\alpha$ ray (using an Ni filter), output: 40 kV/40 mA, slit width: 0.3°, step width: 0.0164°, counting time: 1 second/step, and scanning range: 10 to 90°. After measurement, data are processed by eliminating K$_\alpha$2 at an intensity ratio of 0.5 and further by smoothing, and compared. When a range of 10 to 60° of the measurement is observed in detail, three signals of a diffraction line at 28.4° attributed to Si (111) of a diamond structure, a diffraction line at 47.2° attributed to Si (220), and a diffraction line at 56.0° attributed to Si (311) are observed as a sharp signal having strong intensity. In addition thereto, signals having a weak intensity are observed on a slightly lower angle side of each of the signals.

The silicon-containing particles of the present invention has a shoulder or a separate signal on a higher angle side of all signals. In the present invention, the signal at 28.4° that has the strongest intensity is defined. A diffraction line at 28.6° which is observed together with a diffraction line at 28.4° that is attributed to Si (111) is attributed to silicon having a zinc blende structure by database retrieval and it is found to have a distortion in diamond structure. Therefore, it is inferred that in the silicon-containing particles of the present invention, owing to the distortion of the crystal structure, a volume expansion is relaxed and the battery characteristics are improved.

In the silicon-containing particles having a peak top at 28.6°, also in the case where by adding other elements, electron conductivity is improved to drastically reduce the volume resistivity, a similar diffraction line can be observed.

As an element to be added, from the viewpoint of vapor pressure and effect, one kind or two or more kinds selected from boron, aluminum, phosphorus, titanium, vanadium, chromium, manganese, iron, cobalt, nickel, copper, zinc, arsenic, germanium, tin, antimony, indium, tantalum, tungsten, and gallium are particularly preferable. Other element like this is added to an extent that does not damage a battery capacity of silicon, and an amount to be added may be about 10% by mass or less, preferably 0.001 to 1% by mass, more preferably 0.01 to 0.6% by mass. When the amount to be added thereto is 0.001% by mass or more, the volume resistivity can be surely decreased, and when the amount to be added thereof is 1% by mass or less, a segregation of an added element is suppressed, and a volume expansion can be prevented from increasing.

Such silicon-containing particles have amorphous or nano-size crystal particles, and, owing to stress relaxation effect of grain boundaries, particle collapse during charge/discharge cycles can be reduced. Therefore, when the silicon-containing particles are used in a negative electrode of a nonaqueous electrolyte secondary battery, battery characteristics that can endure stress of volume expansion change owing to charge/discharge and have a high capacity and a long life are exhibited.

Next, a method of manufacturing silicon-containing particles of the present invention, a negative electrode material, a negative electrode, and a nonaqueous electrolyte secondary battery, in which the silicon-containing particles are used as a negative electrode active material, will be detailed. However, it goes without saying that the present invention is not limited thereto.

First, for example, under reduced pressure, silicon can be deposited on a deposition substrate by vapor deposition. Further, it is also preferable to vapor deposit silicon and one kind or two or more kinds selected from boron, aluminum, phosphorus, titanium, vanadium, chromium, manganese, iron, cobalt, nickel, copper, zinc, arsenic, germanium, tin, antimony, indium, tantalum, tungsten, and gallium as a raw material to deposit an silicon alloy.

Here, silicon used as a raw material may be any one of single crystal silicon, polycrystalline silicon, and amorphous silicon, which are differentiated by crystallinity, or any one of chemical grade silicon and metallurgical grade silicon, which are called metallic silicon depending on purity. In particular, metallic silicon that is cheap is preferable.

There are various vapor deposition methods of silicon differentiated by heating methods. However, an electron beam heating method that has a thermal efficiency higher than that of an induction heating method is advantageous.

When silicon is vapor deposited by an electron beam heating method, for example, a raw material of metallic silicon is accommodated in a copper hearth and a chamber is depressurized. In particular, when a copper hearth is provided with a graphite or WC hearth liner, contamination from the copper hearth can be prevented and a thermal efficiency by an irradiated electron beam can be improved.

When the silicon-containing particles of the present invention are vapor deposited by such the electron beam heating method, as conditions of irradiating an electron beam on metallic silicon to vapor deposit, by controlling an output of an electron beam (electron gun), vapor deposition can be conducted such that silicon-containing particles have a diffraction line with a peak at 2θ=28.6° in X-ray diffractometry.

When a melt amount is about 20 kg or less, an output may be set to 50 to 250 kW, and, when a hearth liner is used together, an output can be reduced to 50 to 150 kW. When an electron beam output per area is used, it is 0.2 to 5 kW/cm$^2$. In the case of 0.2 kW/cm$^2$ or less, a vapor deposition speed is not enough and productivity is low. On the other hand, in the case of exceeding 5 kW/cm$^2$, a melt liquid level becomes unstable to be liable to cause bumping. Further, 0.5 to 3.5 kW/cm$^2$ is preferable, and when an electron beam is irradiated in the range, silicon-containing particles of the present invention can be efficiently obtained.

Further, as another condition, a degree of decompression of a chamber can be generally set to $1 \times 10^{-5}$ to $1 \times 10^{-2}$ Pa. The smaller the degree of decompression is, the larger an increase in an amount of vapor deposition can be expected. However, when the degree of decompression is $1 \times 10^{-5}$ Pa or more, a load of a decompressor can be made smaller and a low cost apparatus can be obtained. On the other hand, when the degree of decompression is $1 \times 10^{-2}$ Pa or less, an output of an electron gun can be stabilized and heating by electron beam becomes easy.

As a deposition substrate, a substrate that is configured of a material that does not form an alloy with silicon during deposition of silicon is desirable. That an alloy is not formed with silicon during deposition of silicon means that when silicon is deposited, silicon is not firmly fixed, is difficult to form an alloy, and can be easily peeled off from the deposition substrate after deposition. As materials like this, for example, stainless steel such as SUS 304 and SUS 340, stainless steel of which surface is mirror treated, plated or coated can be used.

When, like this, a deposition substrate is formed of a material that does not form an alloy with silicon during deposition of silicon, deposited silicon can be easily peeled off from the substrate and can be easily crushed and classified. Therefore, productivity can be made higher and the silicon-containing particles of the present invention can be produced at a cheaper cost.

Further, a temperature of the deposition substrate is preferably controlled. The temperature is controlled preferably in the range of 200 to 600° C. and particularly preferably in the range of 300 to 500° C. As a method thereof, a method where a hot wire is embedded in a deposition substrate and a method of indirectly heating with an infrared heater can be cited. When a deposition substrate is formed in cylinder, in addition to the embedded heater, another heating medium may be used. Further, since during vapor deposition, owing to radiation heat of a melt, a deposition substrate may be heated higher than a desired temperature, it is desirable to use a cooling medium together with a heating medium. As a method of controlling a temperature of the deposition substrate, a direct method where a sheathed thermocouple or a platinum resistance temperature detector is used, or a non-contact method where a radiation thermometer or an optical pyrometer is used may be adopted.

When the deposited silicon is continually heated at 200 to 1100° C. in an inert gas atmosphere or under reduced pressure, an internal strain of deposited particles is relaxed and a BET specific surface area is reduced. The heating process may be conducted in a state of a silicon ingot after deposition, or after crushing and classification, for about 1 to 5 hours, in particular at a temperature from 600 to 1000° C. for 1 to 3 hours.

Further, the deposited silicon is recovered from the substrate and crushed and classified by a well-known method to obtain a desired particle size.

As a crusher to be used, for example, a ball mill where a crushing medium such as balls or beads is moved, and an impact force, a friction force or a compression force due to kinetic energy thereof is utilized to crush a material to be crushed, a medium stirring mill, a roller mill where a compression force due to a roller is used to crush, a jet mill where a material to be crushed is collided with a lining material at a high speed or particles of a material to be crushed are collided with each other to crush by an impact force due to impact, a hammer mill where a material to be crushed is crushed by making use of an impact force due to rotation of a rotor to which a hammer, a blade and a pin are fixed, a pin mill, a disc mill, a colloid mill that uses a shearing force, or a high-pressure wet impact disperser "Ultimizer" can be used.

Either of a wet crushing process or a dry crushing process can be used.

Further, in order to arrange a particle size distribution, after crushing, a dry classification, a wet classification or a sieve classification is conducted.

In the dry classification, by mainly using an air flow, processes of dispersion, separation (separation between fine particles and coarse particles), collection (separation between solid and gas), and exhaust are sequentially or simultaneously performed. In order not to deteriorate a classification efficiency by an influence of interference between particles, a shape of particles, a disturbance of air flow, a velocity distribution and static electricity, a pretreatment (adjustment of moisture, dispersibility and humidity) is performed before classification, or moisture or oxygen concentration of an air flow used in the classification can be controlled.

Further, in a dry type where a classifier is integrated with a crusher, crushing and classification are simultaneously conducted to be able to obtain a desired particle size distribution.

Crushing and classification can be conducted so that a particle size of silicon-containing particles may be 1 µm or more and 20 µm or less by a volume average value $D_{50}$ (that is, a particle size or a median size when a cumulative volume is 50%) by a laser diffraction scattering particle size analysis method.

By setting the $D_{50}$ to 1 µm or more, a risk that a bulk density decreases to reduce a charge/discharge capacity per unit volume can be made very low.

Further, by setting the $D_{50}$ to 20 µm or less, a risk of penetrating through a negative electrode film to cause a short circuit can be suppressed to the minimum level, and, likelihood of peeling off from a current collector can be made sufficiently low without becoming difficult to form an electrode.

Further, by performing a thermal chemical vapor deposition treatment on the silicon-containing particles that have been crushed to a predetermined particle size by introducing a hydrocarbon-based compound gas and/or steam under normal pressure or reduced pressure at a temperature of 600 to 1200° C. (preferably 800 to 1000° C.) for an as short as possible time, electroconductivity may be further improved.

Similarly, the silicon-containing particles that have been crushed to a predetermined particle size may be surface coated with a metal oxide such as aluminum oxide, titanium oxide, zinc oxide or zirconium oxide.

When such the silicon-containing particles that have been produced according to a method of the present invention (particles of silicon or silicon alloy obtained by vapor phase deposition) are used as a negative electrode active material of a negative electrode for a nonaqueous electrolyte secondary battery, a battery that has a capacity higher than that of conventional graphite and an irreversible capacity smaller than that of silicon oxide and a material in which silicon oxide is a raw material (for example, a silicon/silicon dioxide dispersion composite obtained by disproportionating silicon oxide) can be provided. Further, a nonaqueous electrolyte secondary battery that is excellent in the cycle characteristics such that even when compared with metallic silicon itself, a volume change accompanying charge/discharge is controlled smaller, and adhesiveness between particles and a binder is more excellent, in particular, a lithium ion secondary battery can be produced.

Further, since the silicon-containing particles can be produced from cheap metallic silicon as a raw material, a negative electrode active material has an advantage of being very cheap while having an excellent battery characteristics, therefore, also a production cost of a nonaqueous electrolyte secondary battery can be reduced.

When a negative electrode material is manufactured from the silicon-containing particles of the present invention, a binder is preferably contained and, as the binder, a polyimide resin is particularly preferably used. Further, other than the polyimide resin, a polyamide resin, a polyamideimide resin, in particular, also an aromatic polyimide resin can be adopted.

For example, the aromatic polyimide resin has excellent solvent resistance and can suppress peeling off from a current collector accompanying a volume expansion due to charge/discharge or separation of an active material.

Now, the aromatic polyimide resin is generally difficult to dissolve in an organic solvent and is necessary not to swell or dissolve particularly with respect to an electrolytic solution.

The aromatic polyimide resin is dissolved generally only in an organic solvent having a high boiling temperature, for example, in cresol. Therefore, when an electrode paste is prepared, it is desirable that a precursor of polyimide is added in a state of polyamic acid that is relatively easily dissolved in various organic solvents such as dimethyl formamide, dimethyl acetamide, N-methylpyrrolidone, ethyl acetate, acetone, methyl ethyl ketone, methyl isobutyl ketone, and dioxolane, and heated for a long time at a temperature of 300° C. or more to dewater and imidize to obtain a binder.

In this case, the aromatic polyimide resin has a basic skeleton configured of tetracarboxylic dianhydride and diamine. As specific examples thereof, aromatic tetracarboxylic dianhydrides such as pyromellitic dianhydride, benzophenone tetracarboxylic dianhydride and biphenyl tetracarboxylic dianhydride; alicyclic tetracarboxylic dianhydrides such as cyclobutane tetracarboxylic dianhydride, cyclopentane tetracarboxylic dianhydride and cyclohexane tetracarboxylic dianhydride; and aliphatic tetracarboxylic dianhydrides such as butane tetracarboxylic dianhydride are preferably used.

Further, examples of the diamines include aromatic diamines such as p-phenylenediamine, m-phenylenediamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy)diphenyl sulfone, and 2,2'-bis[4-(4-aminophenoxy)phenyl]propane, alicyclic diamines, and aliphatic diamines.

As a synthetic method of a polyamic acid intermediate, a standard solution polymerization method can be preferably used. Examples of solvents that are used in the solution polymerization method include N,N'-dimethylformamide, N,N'-dimethylacetamide, N-methyl-2-pyrrolidone, N-methyl caprolactam, dimethyl sulfoxide, tetramethylurea, pyridine, dimethyl sulfone, hexamethylphosphoramide and butylolactone. These can be used solely or in a mixture thereof.

A reaction temperature at this time is usually in the range of $-20$ to $150°$ C. However, a range of $-5$ to $100°$ C. is particularly desirable.

Further, in order to convert a polyamic acid intermediate into a polyimide resin, usually a anhydration ring closure reaction is conducted by heating. As a temperature of the anhydration ring closure reaction by heating, an optional temperature of 140 to $400°$ C., preferably of 150 to $250°$ C. can be selected. A time necessary for the anhydration ring closure reaction is adequately 30 seconds to 10 hours, preferably 5 minutes to 5 hours, though depending on the reaction temperature.

As such polyimide resins, other than polyimide resin powder, a N-methylpyrrolidone solution of polyimide precursor can be obtained. For example, U-Varnish A, U-Varnish S, UIP-R, and UIP-S (manufactured by Ube Industries, Ltd.), KAYAFLEX KPI-121 (manufactured by Nippon Kayaku Co., Ltd.), and Rika Coat SN-20, PN-20, and EN-20 (manufactured by New Japan Chemical Co., Ltd.) can be cited.

A blending amount of the negative electrode active material in the negative electrode material of the present invention can be set to 60 to 97% by mass (particularly 70 to 95% by mass, above all 75 to 95% by mass) with respect to an entirety of the negative electrode material. In the case where a conductive agent described below is blended in the negative electrode material, the upper limit of the blending amount of the negative electrode active material is preferably set to 96% by mass or less (particularly 94% by mass or less, above all 93% by mass or less).

Further, a blending amount of the binder in the negative electrode material is preferably at a ratio of 3 to 20% by mass (more desirably 5 to 15% by mass) with respect to an entire negative electrode material. When the blending amount of the binder is set in the above range, a risk of separation of the negative electrode active material can be made as small as possible, and a risk where a decrease in porosity makes an insulating layer thicker to disturb movement of Li ions can be made as small as possible.

When the silicon-containing particles as an active material and a polyimide resin as a binder are used to manufacture a negative electrode material, in addition thereto, a conductive agent such as graphite can be added to improve the conductivity.

In this case, the kind of the conductive agent is not particularly limited as long as it is an electron conductive material that is not decomposed or modified in a battery configured therewith. Specifically, powders or fibers of metals such as Al, Ti, Fe, Ni, Cu, Zn, Ag, Sn and Si, or graphites such as natural graphite, man-made graphite, various kinds of cokes powders, mesophase carbon, vapor phase grown carbon fiber, pitch-based carbon fiber, PAN-based carbon fiber, and various kinds of resin burning bodies can be used.

Further, when these conductive agents are in advance added to water or a solvent such as N-methyl-2-pyrrolidone to prepare a dispersion, and the dispersion is added, an electrode paste where the conductive agent is uniformly adhered to or dispersed in silicon-containing particles can be prepared. Therefore, it is preferable that the conductive agent is added as the solvent dispersion. The conductive agent can be dispersed in the solvent also with the well-known surfactant. Further, a solvent used in the conductive agent is desirably a solvent the same as that used in the binder.

When a conductive agent is used, an addition amount thereof is 0 to 37% by mass (more preferably 1 to 37% by mass) with respect to an entire negative electrode material, and, when a conductive agent is blended in water or a solvent, an amount blended thereof may be 1 to 37% by mass (more preferably 1 to 20% by mass, further more preferably 2 to 10% by mass).

When an addition amount and a blending amount of the conductive agent are set in the above ranges, it can be surely suppressed that the conductivity of a negative electrode material becomes poor to make an initial resistance higher. Further, a risk where an amount of the conductive agent increases to make a battery capacity lower can be eliminated.

Further, carboxymethylcellulose, sodium polyacrylate, other acrylic polymers or aliphatic esters may be added as a viscosity control agent, in addition to a binder such as the polyimide resin.

The negative electrode material for a nonaqueous electrolyte secondary battery of the present invention obtained as described above can be made a negative electrode as shown below, for example.

That is, the negative electrode material configured of the negative electrode active material, the conductive agent, the binder and other additive, and a solvent suitable for dissolving or dispersing the binder such as N-methylpyrrolidone or water are kneaded to form a pasty mixture, and the mixture is coated on a current collector in sheet shape. In this case, as a current collector, a material usually used as a current collector of a negative electrode such as a copper foil or a nickel foil can be used without particularly limiting a thickness or a surface treatment. As a molding method for molding the mixture in sheet shape, a particcular method is not limited, but a well known method can be used.

Since a negative electrode containing such the negative electrode material for a nonaqueous electrolyte secondary battery is mainly configured of a negative electrode active material made of the silicon-containing particles of the present invention of which a volume change during charge/discharge is largely smaller than that of conventional silicon-containing particles, a thickness change before and after charge does not exceed three times (preferably 2.5 times).

By using a negative electrode compact that uses thus-obtained negative electrode, a nonaqueous electrolyte secondary battery, in particular, a lithium ion secondary battery can be manufactured.

In this case, the nonaqueous electrolyte secondary battery is characterized in using the negative electrode compact described above, and materials of other positive electrode (compact), separator, electrolytic solution and non-aqueous electrolyte and a battery shape are not particularly limited.

For example, as a positive electrode active material, an oxide or a sulfide that can store and release lithium ions can be cited, and any one kind or two kinds or more thereof are used.

Specifically, metal sulfides or metal oxides that do not contain lithium such as $TiS_2$, $MoS_2$, $NbS_2$, $ZrS_2$, $VS_2$ or $V_2O_5$, $MoO_3$ and $Mg(V_3O_8)_2$ can be cited, or lithium and lithium composite oxides that contain lithium, and, also composite metals such as $NbSe_2$ and iron olivinate can be cited. Among these, in order to make energy density higher, a lithium composite oxide mainly configured of $Li_pMetO_2$ is desirable. In the formula, Met is preferred to be at least one kind of cobalt, nickel, iron and manganese, and p is usually a value in the range of $0.05 \leq p \leq 1.10$. Specific examples of such lithium composite oxides include $LiCoO_2$, $LiNiO_2$, $LiFeO_2$, and $Li_qNi_rCo_{1-r}O_2$ (here, values of q and r are different depending on a charge/discharge state of a battery, usually, $0<q<1$, $0.7<r\leq1$), which have a layered structure, $LiMn_2O_4$ having a spinel structure and orthorhombic $LiMnO_2$. Further, as a high voltage responsive type, $LiMet_sMn_{1-s}O_4$ ($0<s<1$) is used as a substituted spinel manganese compound. In this case, as Met, titanium, chromium, iron, cobalt, nickel, copper and zinc are cited.

The lithium composite oxides described above can be prepared in such a manner that, for example, a carbonate, a nitrate, an oxide or a hydroxide of lithium and a carbonate, a nitrate, an oxide or a hydroxide of a transition metal are crushed and mixed in accordance with a desired composition and fired in an oxygen atmosphere at a temperature in the range of 600 to 1000° C.

Further, as a positive electrode active material, an organic substance also can be used. Examples thereof include polyacetylene, polypyrrole, polyparaphenylene, polyaniline, polythiophene, polyacene, and polysulfide compounds.

The positive electrode active material described above, when kneaded together with the conductive agent and the binder, which were used in the negative electrode mixture, and coated on a current collector, can form a positive electrode compact by a well-known method.

Further, a separator used between a positive electrode and a negative electrode is not particularly limited as long as it is stable against an electrolytic solution and has excellent liquid retention characteristics. In general, porous sheets of polyolefins such as polyethylene and polypropylene and copolymers thereof and an aramid resin or nonwoven fabrics can be cited. These may be used in a single layer or in multi-layers by stacking, or, ceramics such as metal oxide may be laminated on a surface. Further, porous glass and ceramic are also used.

A solvent for a nonaqueous electrolyte secondary battery used in the present invention is not particularly limited as long as it can be used as a nonaqueous electrolytic solution.

In general, aprotic solvents having a high dielectric constant such as ethylene carbonate, propylene carbonate, butylene carbonate, and γ-butyrolactone; acetate esters such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolan, sulfolane, methyl sulfolane, acetonitrile, propionitrile, anisole, and methyl acetate; or aprotic low viscosity solvents such as ester propionate can be cited. These aprotic solvents having a dielectric constant and aprotic low viscosity solvents are desirably used together at an adequate mixing ratio.

Further, an ionic liquid that uses imidazolium, ammonium and pyridium type cation can be used. A counter anion is not particularly limited. However, $BF_4^-$, $PF_6^-$, and $(CF_3SO_2)_2N^-$ are cited. The ionic liquid may be used by mixing with the nonaqueous electrolytic solvent.

When a solid electrolyte or a gel electrolyte is used, silicone gel, silicone polyether gel, acrylic gel, silicone acrylic gel, acrylonitrile gel, or poly(vinylidene fluoride) may be contained as a polymer material. These may be polymerized in advance or polymerized after injection. These may be used solely or as a mixture thereof.

Further, as electrolyte salts, for example, light metal salts can be cited.

Examples of the light metal salts include alkali metal salts such as lithium salts, sodium salts or potassium salts, or alkali earth metal salts such as magnesium salts or calcium salts, or aluminum salts. In accordance with the object, one kind or a plurality of kinds thereof are selected. As for the lithium salts, for example, $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)_2NLi$, $((CF_3)_2CHOSO_2)_2NLi$, $(CF_3SO_2)_3CLi$, $(3,5\text{-}(CF_3)_2C_6F_3)_4BLi$, $LiCF_3$, $LiAlCL_4$ or $C_4BO_9Li$ can be cited. Among these, any one kind or two or more kinds can be mixed and used.

A concentration of the electrolyte salt in the nonaqueous electrolytic solution is desirably 0.5 to 2.0 mol/L from the viewpoint of conductivity. The conductivity of the electrolyte at a temperature of 25° C. is desirably 0.01 S/cm or more and can be adjusted by a kind or a concentration of the electrolyte salt.

Further, various kinds of additives may be added in the nonaqueous electrolytic solution, as required.

For example, in order to improve the cycle life, vinylene carbonate, methyl vinylene carbonate, ethyl vinylene carbonate, and 4-vinyl ethylene carbonate can be cited. In order to prevent overcharge, biphenyl, alkyl biphenyl, cyclohexyl benzene, t-butylbenzene, diphenyl ether, and benzofuran can be cited. Further, in order to deoxidize or dewater, various kinds of carbonates, various kinds of carboxylic anhydrides, various kinds of nitrogen-containing and sulfur-containing compounds can be cited.

A shape of the nonaqueous electrolyte secondary battery is optional and is not limited particularly. In general, a coin type battery where an electrode and a separator, which were punched in coin are laminated, or a square or cylindrical battery where an electrode sheet and a separator sheet are spirally wound can be cited.

EXAMPLES

Hereinafter, the present invention will be more specifically described with reference to examples and comparative examples. However, the present invention is not limited thereto.

In the following examples, a BET specific surface area was measured by an automatic specific surface area meter (BEL-SORP-mini II, manufactured by the BEL JAPAN, INC.), and volume resistivity was measured by a four probe volume resistivity meter (MCP-PD51, manufactured by Mitsubishi Chemical Co., Ltd.) and a value under 20 kN load was shown. Further, a 50% cumulative volume diameter $D_{50}$ was measured by a laser diffraction particle size distribution meter (MT3300EX II, manufactured by NIKKISO CO., LTD.) in wet. X-ray diffractometry was performed according to the above method, and an intensity ratio of $2\theta=28.4°$ and $28.6°$ was calculated.

Example 1

Inside a vacuum chamber having an exhaust system including an oil diffusion pump, a mechanical booster pump, and an oil rotary vacuum pump, a copper crucible having a carbon hearth liner having a thickness of 20 mm was set, 8 kg of a metal silicon ingot was charged, and the inside of the chamber was depressurized. Ultimate pressure after evacuation for 2 hours was $2\times10^{-4}$ Pa.

Next, a linear electron gun provided to the chamber was used to start melting an ingot of metal silicon, and after melting the ingot of metal silicon, vapor deposition was continued under output of 120 kW and a beam area of 74 cm$^2$ for 2 hours. During vapor deposition, a temperature of a deposition substrate configured of stainless steel was controlled at 400° C. By opening the chamber, an ingot of 3.5 kg of deposited silicon was obtained.

Figure 1:
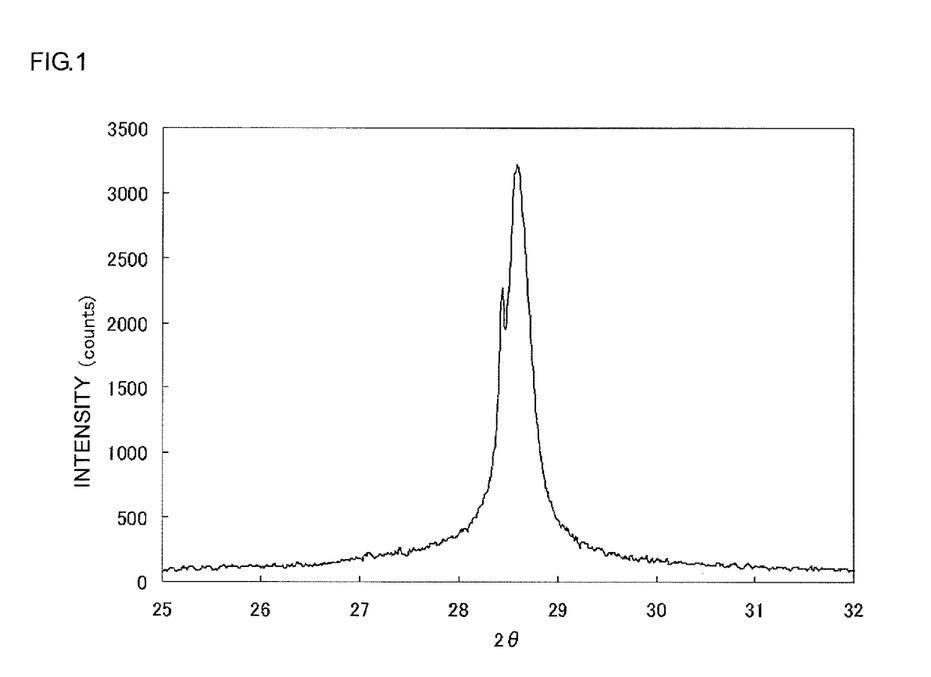
FIG. 1 is a diagram showing by partially expanding an XRD spectrum measured in Example 1.

The produced deposited silicon was crushed and classified by a jet mill (KJ-25, manufactured by Kurimoto, Ltd.), and silicon particles having $D_{50}$=8.0 μm and a BET specific surface area of 2.7 m$^2$/g were obtained. By X-ray diffractometry, as was shown in FIG. 1, a signal at 2θ=28.4° and a signal at 2θ=28.6° were observed, and an intensity ratio of a signal at 2θ=28.6° to a signal at 2θ=28.4° was 1.42.

Example 2

The silicon particles obtained in Example 1 were heated by holding in an electric furnace having an alumina furnace tube held at 800° C. by an argon atmosphere, and silicon particles having $D_{50}$=8.0 μm and a BET specific surface area of 2.6 m$^2$/g were obtained.

Figure 2:
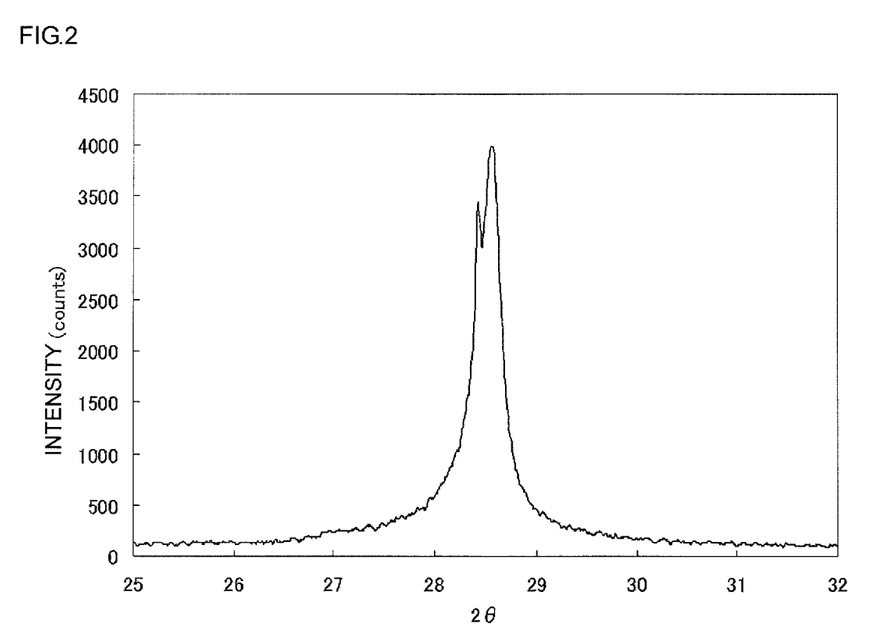
FIG. 2 is a diagram showing by partially expanding an XRD spectrum measured in Example 2.

When analyzed by X-ray diffractometry, as shown in FIG. 2, a signal at 2θ=28.4° and a signal at 2θ=28.6° were observed, and an intensity ratio of a signal at 2θ=28.6° to a signal at 2θ=28.4° was 1.16.

Example 3

In a manner the same as that of example 1 except that by using an ingot of 11 kg of metal silicon containing 0.6% by mass of aluminum, vapor deposition was conducted under output of 125 kW and a beam area of 73 cm$^2$, vapor deposition was conducted for 3 hours, thereby an ingot of 4.5 kg of deposited silicon was obtained.

The produced deposited silicon was crushed and classified by a jet mill (KJ-25, manufactured by Kurimoto, Ltd.), and heated by holding in an electric furnace having an alumina furnace tube held at 600° C. in an argon atmosphere. Thereby, silicon-containing particles having $D_{50}$=8.5 μm and a BET specific surface area of 1.8 m$^2$/g were obtained.

Figure 3:
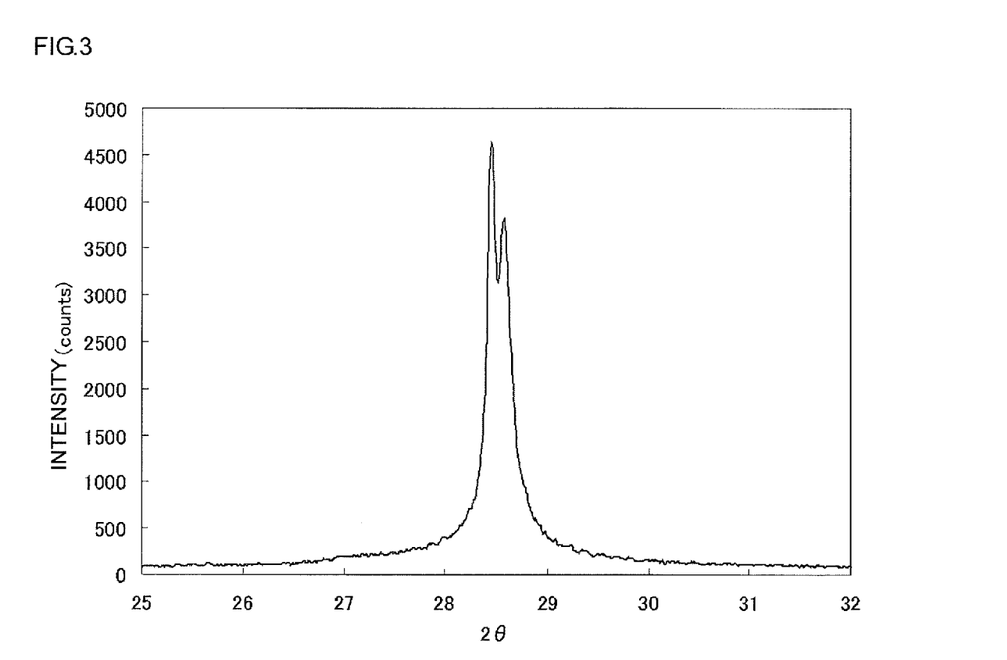
FIG. 3 is a diagram showing by partially expanding an XRD spectrum measured in Example 3.

An aluminum content of the silicon-containing particles was 1.0% by mass. Further, when analyzed by X-ray diffractometry, as shown in FIG. 3, a signal at 2θ=28.4° and a signal at 2θ=28.6° were observed, and an intensity ratio of a signal at 2θ=28.6° to a signal at 2θ=28.4° was 0.82.

Example 4

In a manner the same as that of example 1 except that by using an ingot of 7 kg of metal silicon containing 0.5% by mass of germanium, vapor deposition was conducted under output of 120 kW and a beam area of 73 cm$^2$, vapor deposition was conducted for 2 hours, thereby an ingot of 3.4 kg of deposited silicon was obtained.

The produced deposited silicon was crushed and classified by a jet mill (KJ-25, manufactured by Kurimoto, Ltd.), and heated by holding in an electric furnace having an alumina furnace tube held at 600° C. in an argon atmosphere. Thereby, silicon-containing particles having $D_{50}$=8.2 μm and a BET specific surface area of 2.4 m$^2$/g were obtained.

Figure 4:
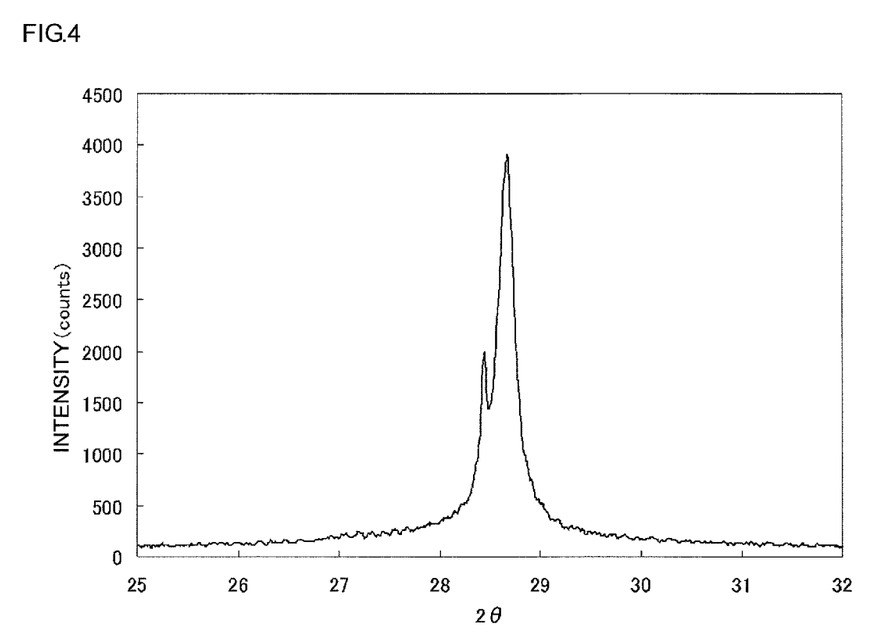
FIG. 4 is a diagram showing by partially expanding an XRD spectrum measured in Example 4.

A germanium content of the silicon-containing particles was 0.6% by mass. Further, when analyzed by X-ray diffractometry, as shown in FIG. 4, a signal at 2θ=28.4° and a signal at 2θ=28.6° were observed, and an intensity ratio of a signal at 2θ=28.6° to a signal at 2θ=28.4° was 1.97.

Example 5

In a manner the same as that of example 1 except that by using an ingot of 9 kg of metal silicon containing 2% by mass of cobalt, vapor deposition was conducted under output of 140 kW and a beam area of 71 cm$^2$, vapor deposition was conducted for 2 hours, thereby an ingot of 4.9 kg of deposited silicon was obtained.

The produced deposited silicon was crushed and classified by a jet mill (KJ-25, manufactured by Kurimoto, Ltd.), and heated by holding in an electric furnace having an alumina furnace tube held at 800° C. in an argon atmosphere. Thereby, silicon-containing particles having $D_{50}$=8.3 μm and a BET specific surface area of 2.3 m$^2$/g were obtained.

Figure 5:
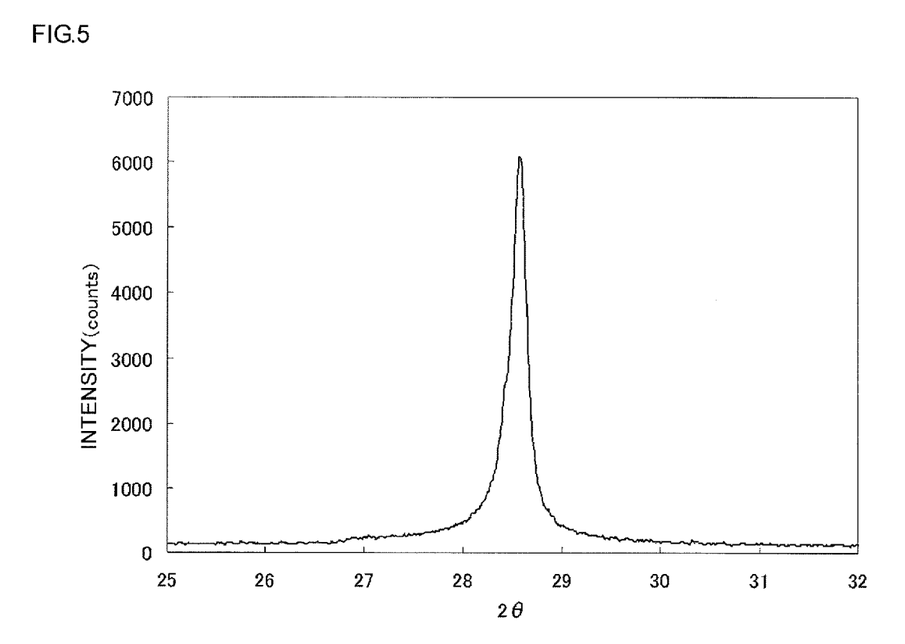
FIG. 5 is a diagram showing by partially expanding an XRD spectrum measured in Example 5.

A cobalt content of the silicon-containing particles was 0.5% by mass. Further, when analyzed by X-ray diffractometry, as shown in FIG. 5, a signal was observed at 2θ=28.6°, and a signal at 2θ=28.4° was a shoulder. An intensity ratio of a signal at 2θ=28.6° to a signal of a shoulder peak at 2θ=28.4° was 2.40.

Comparative Example 1

Inside a vacuum chamber having an exhaust system including an oil diffusion pump, a mechanical booster pump, and an oil rotary vacuum pump, a copper crucible was set, an ingot of 9 kg of metal silicon was charged, and the inside of the chamber was depressurized. Ultimate pressure after evacuation for 2 hours was $2\times10^{-4}$ Pa.

Next, a linear electron gun provided to the chamber was used to start melting the ingot of metal silicon, and after melting the metal silicon ingot, vapor deposition was continued for 1 hour under output of 220 kW and a beam area of 960 cm$^2$. During vapor deposition, a temperature of a deposition substrate configured of stainless steel was controlled at 400° C. By opening the chamber, an ingot of 2.1 kg of deposited silicon was obtained.

Figure 6:
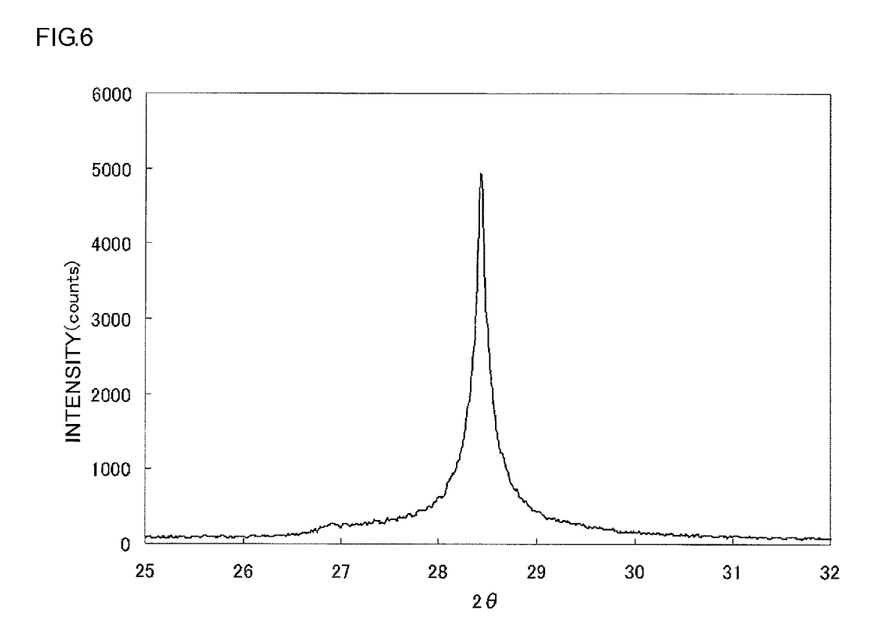
FIG. 6 is a diagram showing by partially expanding an XRD spectrum measured in Comparative Example 1.

The produced deposited silicon was crushed and classified by a jet mill (KJ-25, manufactured by Kurimoto, Ltd.), and heated by holding in an electric furnace having an alumina furnace tube held at 800° C. in an argon atmosphere. Thereby, silicon particles having $D_{50}$=8.5 μm and a BET specific surface area of 1.4 m$^2$/g were obtained. Further, when analyzed by X-ray diffractometry, as shown in FIG. 6, only a signal at 2θ=28.4° was observed, and a signal in the vicinity of 2θ=28.6° on a higher angle side was not observed.

Comparative Example 2

With an ingot of 200 g of metal silicon containing 0.2% by mass of germanium, quenched particulate particles were obtained by gas atomization (VF-RQP1K, manufactured by Makabe Giken Co., Ltd.).

The particulate silicon was crushed and classified by a jet mill (KJ-25, manufactured by Kurimoto, Ltd.) to $D_{50}$=7.3 μm and a BET specific surface area of 1.3 m$^2$/g.

Figure 7:
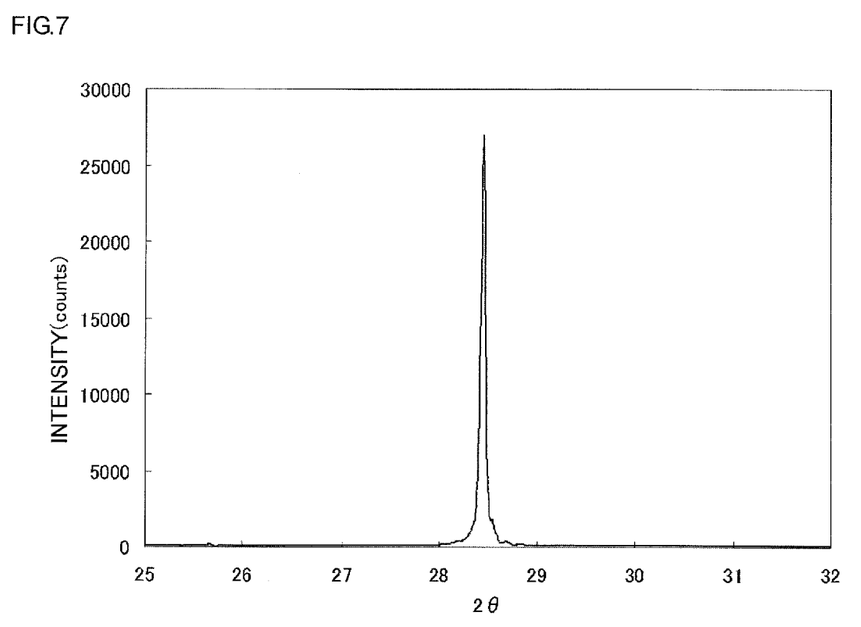
FIG. 7 is a diagram showing by partially expanding an XRD spectrum measured in Comparative Example 2.

A germanium content of the silicon-containing particles was 0.2% by mass. Further, when analyzed by X-ray diffractometry, as shown in FIG. 7, only a signal at 2θ=28.4° was observed, and a signal in the vicinity of 2θ=28.6° on a higher angle side was not observed.

Comparative Example 3

With an ingot of 200 g of metal silicon containing 0.2% by mass of cobalt, quenched particulate particles were obtained by gas atomization (VF-RQP1K, manufactured by Makabe Giken Co., Ltd.).

The particulate silicon was crushed and classified by a jet mill (KJ-25, manufactured by Kurimoto, Ltd.) to $D_{50}=7.7$ μm and a BET specific surface area of 1.5 m$^2$/g.

Figure 8:
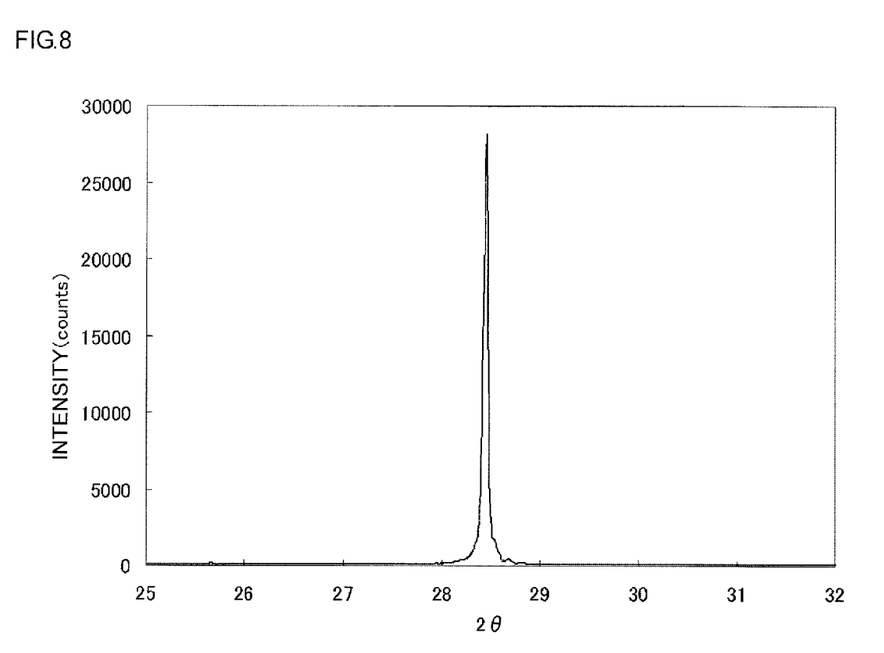
FIG. 8 is a diagram showing by partially expanding an XRD spectrum measured in Comparative Example 3.

A cobalt content of the silicon-containing particles was 0.2% by mass. When analyzed by X-ray diffractometry, as shown in FIG. 8, only a signal at 2θ=28.4° was observed, and a signal in the vicinity of 2θ=28.6° on a higher angle side was not observed.

A cumulative volume 50% diameter $D_{50}$, a BET specific surface area, volume resistivity under load of 20 kN and a ratio of intensities of diffraction lines of signals at 28.4° and in the vicinity of 28.6° in an XRD spectrum of each of the silicon-containing particles obtained according to manufacturing methods of Examples 1 to 5 and Comparative Examples 1 to 3 are shown by summarizing in Table 1.

TABLE 1

| | Additive | | Output of electron beam Kw/cm$^2$ | $D_{50}$ μm | BET cm$^2$/g | Volume resistivity Ω · cm | XRD $I^{28.6}/I^{28.4}$ |
|---|---|---|---|---|---|---|---|
| | Added element | Content (%) | | | | | |
| Example 1 | None | — | 1.6 | 8.0 | 2.7 | $8.62 \times 10^3$ | 1.42 |
| Example 2 | None | — | — | 8.0 | 2.6 | $5.29 \times 10^3$ | 1.16 |
| Example 3 | Al | 0.97 | 1.7 | 8.5 | 1.8 | $3.43 \times 10$ | 0.82 |
| Example 4 | Ge | 0.55 | 1.6 | 8.2 | 2.4 | $1.73 \times 10^3$ | 1.97 |
| Example 5 | Co | 0.53 | 2.0 | 8.3 | 2.3 | $2.16 \times 10^3$ | 2.40 |
| Comparative example 1 | None | — | 0.2 | 8.5 | 1.4 | $5.82 \times 10^6$ | No peak at 28.6° |
| Comparative example 2 | Ge | 0.2 | — | 7.3 | 1.3 | 1.44 | No peak at 28.6° |
| Comparative example 3 | Co | 0.2 | — | 7.7 | 1.5 | 1.90 | No peak at 28.6° |

As shown in Table 1, it was found that in each of negative electrode active materials manufactured under the conditions of Examples 1 to 5, a signal (peak) is observed at a position of 28.6° in an XRD spectrum, and, in experimental ranges of Examples 1 to 5, an intensity ratio of diffraction lines, $I^{28.6}/I^{28.4}$, is in the range of 0.8 to 2.4. On the other hand, in Comparative example 1 that is vapor deposited silicon and silicon-containing particles of Comparative examples 2 to 3 where a raw material of metal silicon was prepared by a liquid quenching method, in an XRD spectrum, a shoulder or a signal was not observed in the vicinity of 28.6°. In Comparative example 1, though silicon particles were prepared by vapor deposition, since an output of an electron beam was too weak, silicon particles where a signal (peak) is not observed at 28.6° was formed.

Further, the respective signal intensities in XRD spectra of Examples 1 to 5 and Comparative example 1 were all low, that is, an effect of miniaturization of Si crystallites owing to a vapor deposition method was observed.

Further, as shown in Table 1, by comparing volume resistivities, it was found that in comparison with Examples 1 and 2 where silicon simple substance was used to prepare, silicon-containing particles of Examples 3 to 5 where another element was doped have lower volume resistivity, that is, excellent conductivity.

<Evaluation of Battery Characteristics>

Electric characteristics of the silicon-containing particles obtained according to Examples 1 to 5 and Comparative Examples 1 to 3 were evaluated to confirm utility as a negative electrode active material.

A mixture of 85% of each of the silicon-containing particles obtained according to Examples 1 to 5 and Comparative Examples 1 to 3 as a negative electrode active material, 2.5% of artificial graphite (average particle size $D_{50}=3$ μm) as a conductive agent, and 2.5% in terms of solid content of a N-methylpyrrolidone dispersion (solid content: 17.5%) of acetylene black was diluted with N-methylpyrrolidone. Therein, 10% in terms of solid content of a polyimide resin (trade name: U-Varnish, solid content: 18%, manufactured by Ube Industries, Ltd.) as a binder was added to prepare a slurry.

The slurry was coated on a copper foil having a thickness of 12 μm by a 75 μm doctor blade, after preliminarily drying, an electrode was pressure formed by a roller press heated at 60° C., and, after drying at 200° C. for 2 hours, by punching into 2 cm$^2$, a negative electrode compact was obtained.

With the resulted negative electrode compact, a lithium foil as a counter electrode, a nonaqueous electrolyte solution in which lithium bis(trifluoromethanesulfonyl)imide is dissolved in a 1: (volume ratio) mixed solution of ethylene carbonate and diethyl carbonate at a concentration of 1 mol/L as a non-aqueous electrolyte, and a polyethylene microporous film having a thickness of 30 μm as a separator, four pieces of lithium ion secondary batteries for evaluation were prepared.

The prepared lithium ion secondary batteries were aged overnight at room temperature, two of the fours were decomposed, a thickness of the negative electrode was measured, and electrode density based on initial weight in a state swollen with an electrolytic solution was calculated. Here, the electrolytic solution and an increase in an amount of lithium due to charge were neglected.

Further, remaining two pieces were charged under a constant current of 0.15c until a voltage of a test cell reaches 0 V by a secondary battery charge/discharge tester (manufactured by Nagano Co., Ltd.), after reaching 0 V, charge was further conducted by decreasing a current so as to maintain a cell voltage at 0 V. Then, when a current value becomes less than 0.02c, the charge was completed, and a charge capacity was calculated. Here, c is a current value that charges a theoretical capacity of a negative electrode for 1 hour.

After charge came to an end, these lithium ion secondary batteries for evaluation were decomposed, and a thickness of the negative electrode was measured. From the measured thickness, electrode density was similarly calculated and obtained a charge capacity per volume during charge was obtained. Results thereof are shown in Table 2.

TABLE 2

| | Electrode density after aging (g/cm³) | Electrode density during charge (g/cm³) | Volume change rate | Charge capacity (mAh/cm³) |
|---|---|---|---|---|
| Example 1 | 1.27 | 0.43 | 3.0 | 1360 |
| Example 2 | 1.26 | 0.46 | 2.7 | 1520 |
| Example 3 | 1.23 | 0.40 | 3.1 | 1260 |
| Example 4 | 1.19 | 0.42 | 2.8 | 1280 |
| Example 5 | 1.25 | 0.49 | 2.6 | 1580 |
| Comparative Example 1 | 1.22 | 0.32 | 3.8 | 1040 |
| Comparative Example 2 | 1.29 | 0.28 | 4.6 | 910 |
| Comparative Example 3 | 1.32 | 0.26 | 5.1 | 840 |

As shown in Table 2, it was found that Examples 1 to 5 have the volume change rates lower than those of Comparative examples 1 to 3 and have charge capacities more excellent than those of Comparative Examples 1 to 3.

In Comparative Example 1 where the deposited silicon particles were produced under an electron beam output of 0.2 kW/cm², a signal was not found in the vicinity of 28.6°. However, high volume change rate and low charge capacity resulted. Further, in Comparative Examples 2 and 3 that are conventional quenched alloys, the volume change rates were further higher and charge capacities were lower than 1000 mAh/cm³.

<Evaluation of Cycle Characteristics>

In order to evaluate the cycle characteristics of the resulted negative electrode compacts, negative electrode compacts were prepared from negative electrode active materials of Examples 2 and 5 and Comparative Examples 1 and 2. By using a single layer sheet that uses $LiCoO_2$ as a positive electrode active material and an aluminum foil as a current collector (trade name: Pioxcel C-100, manufactured by Pionics Co., Japan) as a positive electrode material, a positive electrode compact was prepared. By using a nonaqueous electrolyte solution obtained by dissolving lithium hexafluorophosphate at a concentration of 1 mol/L in a 1:1 (by volume ratio) mixed solvent of ethylene carbonate and diethyl carbonate as a non-aqueous electrolyte and a polyethylene microporous film having a thickness of 30 μm as a separator, a coin shape lithium ion secondary battery was prepared.

Four kinds of coin shape lithium ion secondary batteries prepared were, after leaving at room temperature for two nights, charged at a constant current of 1.2 mA (0.25c on the basis of positive electrode) until a voltage of the test cell reaches 4.2 V by a secondary battery charge/discharge tester (manufactured by Nagano Co., Ltd.), after reaching 4.2 V, charge was conducted by reducing a current to maintain a cell voltage at 4.2 V. Then, when a current value became smaller than 0.3 mA, charge was finished. Discharge was conducted at a constant current of 0.6 mA and was finished when the cell voltage reached 2.5 V, and a discharge capacity was obtained.

The operation was continued 200 cycles. Results thereof are shown in FIG. 9.

Figure 9:
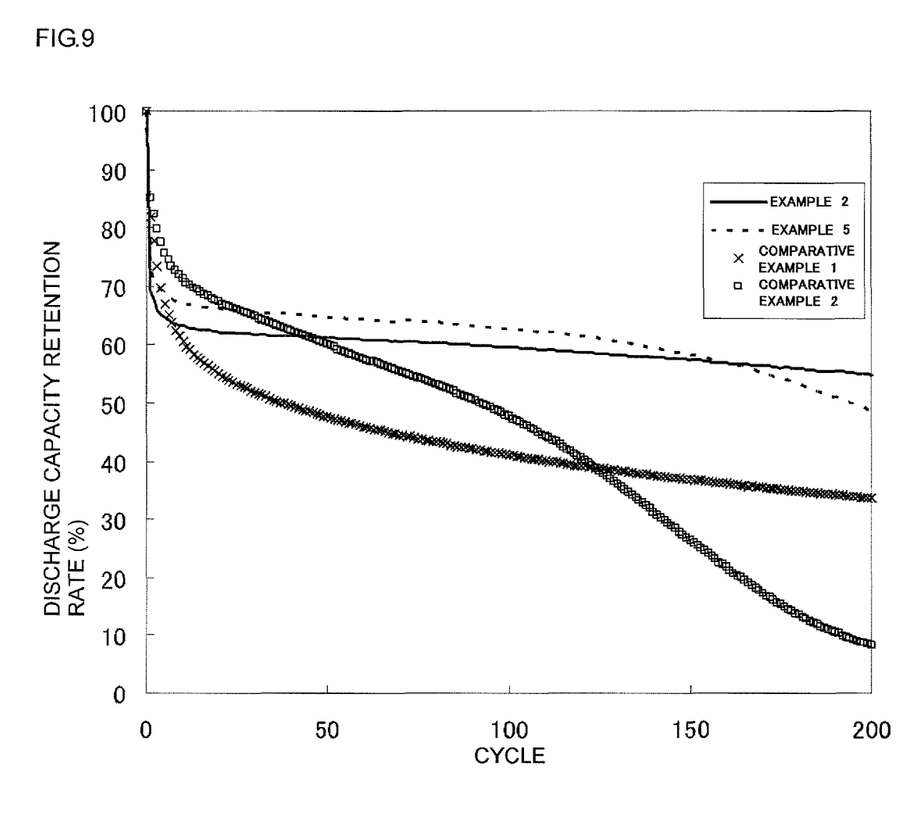
FIG. 9 is a graph showing cycle characteristics of negative electrode active materials produced in Examples 2 and 5, and Comparative Examples 1 and 2.

As shown in FIG. 9, it was found that lithium ion secondary batteries that used negative electrode active materials of Examples 2 and 5 have the cycle characteristics higher than those of lithium ion secondary batteries that used negative electrode active materials of polycrystalline silicon-containing particles of Comparative Examples 1 and 2.

The present invention is not limited to the above-described embodiments. The embodiments are only illustrations, and all what has substantially the same configuration as technical ideas described in claims of the present invention and has the same effect are included in the technical range of the present invention.

What is claimed is:

1. A silicon-containing particle that is used as a negative electrode active material for a nonaqueous electrolyte secondary battery, wherein the silicon-containing particle has diffraction lines with peaks at $2\theta=28.4°$, and $2\theta=28.6°$ in X-ray diffractometry.

2. The silicon-containing particle according to claim 1, wherein the silicon-containing particle contains one kind or two or more kinds selected from boron, aluminum, phosphorus, titanium, vanadium, chromium, manganese, iron, cobalt, nickel, copper, zinc, arsenic, germanium, tin, antimony, indium, tantalum, tungsten, and gallium.

3. A negative electrode material for a nonaqueous electrolyte secondary battery comprising:
the silicon-containing particle according to claim 2 as the negative electrode active material for a nonaqueous electrolyte secondary battery.

4. The negative electrode material for a nonaqueous electrolyte secondary battery according to claim 3, further comprising:
a binder.

5. The negative electrode material for a nonaqueous electrolyte secondary battery according to claim 4, wherein the binder is a polyimide resin.

6. A negative electrode material for a nonaqueous electrolyte secondary battery comprising:
the silicon-containing particle according to claim 1 as the negative electrode active material for a nonaqueous electrolyte secondary battery.

7. A nonaqueous electrolyte secondary battery comprising:
a negative electrode compact including the negative electrode material for a nonaqueous electrolyte secondary battery according to claim 6;
a positive electrode compact;
a separator; and
a nonaqueous electrolyte.

8. The nonaqueous electrolyte secondary battery according to claim 7, wherein the nonaqueous electrolyte secondary battery is a lithium ion secondary battery.

9. The negative electrode material for a nonaqueous electrolyte secondary battery according to claim 6, further comprising:
a binder.

10. A nonaqueous electrolyte secondary battery comprising:
a negative electrode compact including the negative electrode material for a nonaqueous electrolyte secondary battery according to claim 9;
a positive electrode compact;
a separator; and
a nonaqueous electrolyte.

11. The nonaqueous electrolyte secondary battery according to claim 10, wherein the nonaqueous electrolyte secondary battery is a lithium ion secondary battery.

12. The negative electrode material for a nonaqueous electrolyte secondary battery according to claim 9, wherein the binder is a polyimide resin.

13. A nonaqueous electrolyte secondary battery comprising:

a negative electrode compact including the negative electrode material for a nonaqueous electrolyte secondary battery according to claim 12;
a positive electrode compact;
a separator; and
a nonaqueous electrolyte.

14. The negative electrode material for a nonaqueous electrolyte secondary battery according to claim 12, further comprising:
a conductive agent,
wherein a ratio of the negative electrode active material for a nonaqueous electrolyte secondary battery with respect to the negative electrode material is 60 to 97% by mass, a ratio of the binder with respect to the negative electrode material is 3 to 20% by mass, and a ratio of the conductive agent with respect to the negative electrode material is 0 to 37% by mass.

15. A nonaqueous electrolyte secondary battery comprising:
a negative electrode compact including the negative electrode material for a nonaqueous electrolyte secondary battery according to claim 14;
a positive electrode compact;
a separator; and
a nonaqueous electrolyte.

16. The negative electrode material for a nonaqueous electrolyte secondary battery according to claim 9, further comprising:
a conductive agent,
wherein a ratio of the negative electrode active material for a nonaqueous electrolyte secondary battery with respect to the negative electrode material is 60 to 97% by mass, a ratio of the binder with respect to the negative electrode material is 3 to 20% by mass, and a ratio of the conductive agent with respect to the negative electrode material is 0 to 37% by mass.

17. A nonaqueous electrolyte secondary battery comprising:
a negative electrode compact including the negative electrode material for a nonaqueous electrolyte secondary battery according to claim 16;
a positive electrode compact;
a separator; and
a nonaqueous electrolyte.

18. The nonaqueous electrolyte secondary battery according to claim 17, wherein the nonaqueous electrolyte secondary battery is a lithium ion secondary battery.

19. A method of manufacturing a silicon-containing particle that is used as a negative electrode active material for a nonaqueous electrolyte secondary battery comprising:
controlling an output of an electron beam when silicon is vapor deposited by an electron beam heating method so as to produce a silicon-containing particle having a diffraction line with a peak at $2\theta=28.6°$ in X-ray diffractometry,
wherein the output of the electron beam is controlled in the range of 0.5 to 3.5 $kW/cm^2$.

* * * * *